(12) United States Patent
Matsuda et al.

(10) Patent No.: US 6,201,340 B1
(45) Date of Patent: Mar. 13, 2001

(54) ACTUATOR

(75) Inventors: Shinya Matsuda, Kyoto; Takashi Matsuo, Itami, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/431,126

(22) Filed: Nov. 1, 1999

(30) Foreign Application Priority Data

Nov. 2, 1998 (JP) .................................................. 10-312419

(51) Int. Cl.$^7$ ...................................................... H01L 41/08
(52) U.S. Cl. ........................................ 310/328; 310/323.02
(58) Field of Search ............................ 310/328, 323.02, 310/323.16

(56) References Cited

U.S. PATENT DOCUMENTS

| | | | |
|---|---|---|---|
| 4,613,782 | 9/1986 | Mori et al. ............................ | 310/328 |
| 4,950,135 | * 8/1990 | Tojo et al. ........................ | 310/328 X |
| 5,132,582 | * 7/1992 | Hayashi et al. .................. | 310/323.02 |
| 5,917,271 | * 6/1999 | Yamamura ............................ | 310/328 |

FOREIGN PATENT DOCUMENTS 8-289573    11/1996    (JP) .

\* cited by examiner

*Primary Examiner*—Mark O. Budd
(74) *Attorney, Agent, or Firm*—McDermott, Will & Emery

(57) ABSTRACT

In a truss type actuator having two piezoelectric devices provided for crossing at right angle and driven by two alternating driving signals having a predetermined phase difference between them for driving a chip member along a predetermined elliptic trail (including a circular trail). The piezoelectric devices are contacted by protrusions having a high rigidity and formed on contacting faces of the chip member and a base member for holding the piezoelectric devices, and fixed by adhesive having a low rigidity and filled around the protrusions. Thereby, one of the piezoelectric device hardly receives a reaction force from another piezoelectric device due to the displacement thereof.

20 Claims, 6 Drawing Sheets

ACTUATOR

This application is based on patent application Hei.10-312419 filed in Japan, the content of which are hereby incorporated by references.

BACKGROUND OF THE INVENTION

1. Field of the Invention

This invention relates to a truss type actuator having a plurality of (for example, two) displacing devices such as piezoelectric devices crossing at right angle, and respectively driven by alternating driving .voltages having a phase difference between them for generating a driving force owing to an elliptical movement of a chip member provided at crossing point of the displacing devices.

2. Description of the Related Art

Conventionally, a truss type piezoelectric actuator is known from Publication Gazette of Unexamined Japanese Patent Application Hei 8-289573 (hereinafter abbreviated as first prior art) or U.S. Pat. No. 4613782 (hereinafter abbreviated as second prior art).

In the first prior art, contacting faces at base ends of two piezoelectric devices (first piezoelectric device and second piezoelectric device) are fixed on a base member, and contacting faces at top ends of the piezoelectric devices are also fixed to a chip member provided at a cross point of the piezoelectric devices. The first prior art, however, does not teach the method for fixing the piezoelectric devices and the base member, and so on. On the other hand, in the second prior art, each piezoelectric device and a driving element are fixed by a resultant motion mechanism having a rigidity in a direction parallel to a displacing direction of the piezoelectric device and a flexibility in a direction perpendicular to the displacing direction of the piezoelectric device.

In the first prior art, when the first piezoelectric device is driven for displacing, a bending force acts on the second piezoelectric device in a transverse direction thereof, and the first piezoelectric device receives a reaction force from the second piezoelectric device. In case of fixing the base member and the chip member on each piezoelectric device by a material having a high rigidity, the displacement of the first piezoelectric device is restricted by the reaction force from the second piezoelectric device, so that the output power of the actuator is reduced. To the contrary, in case of fixing the base member and the chip member on each piezoelectric device by a material having a low rigidity, when the piezoelectric devices are driven by driving voltages having a high frequency, the vibration is absorbed by the adhesive layer, so that the output power of the actuator is reduced.

In the second prior art, a resonance frequency of the piezoelectric device is reduced due to a weight of the resultant motion mechanism, so that the output power of the actuator is reduced. Furthermore, a plurality of resonance vibration modes occur due to the addition of the mechanical members, so that the control of the actuator becomes difficult.

SUMMARY OF THE INVENTION

An object of this invention is to provide an actuator having a plurality of displacing devices which can easily be controlled and can output a high power.

An actuator in accordance with an aspect of the present invention comprises a plurality of displacing devices provided for crossing at a predetermined angle and a driving member provided at a crossing point of the displacing devices. The displacing devices are respectively driven by a plurality of alternating driving signals having a predetermined phase difference between two of them for moving the driving member as a predetermined motion. Each displacing device and the driving member and a base member for holding the displacing device are fixed by a composition of a plurality of kinds of members having different rigidity.

Thus, when one of the displacing device is displaced, it hardly receives reaction force from another displacing device, so that the driving member can be driven for trailing substantially the same trail as a predetermined trail of standard design. As a result, the reduction of the output power of the actuator due to the energy loss becomes very few. Furthermore, the driving member trails substantially the same trail as the ideal trail of standard design, so that the noise and the vibration occurring when the driving member contacts a driven member such as a rotor can be reduced, and the output of the actuator becomes stable.

DETAILED DESCRIPTION OF THE EMBODIMENT

An embodiment of an actuator in accordance with the present invention is described.

Figure 1:
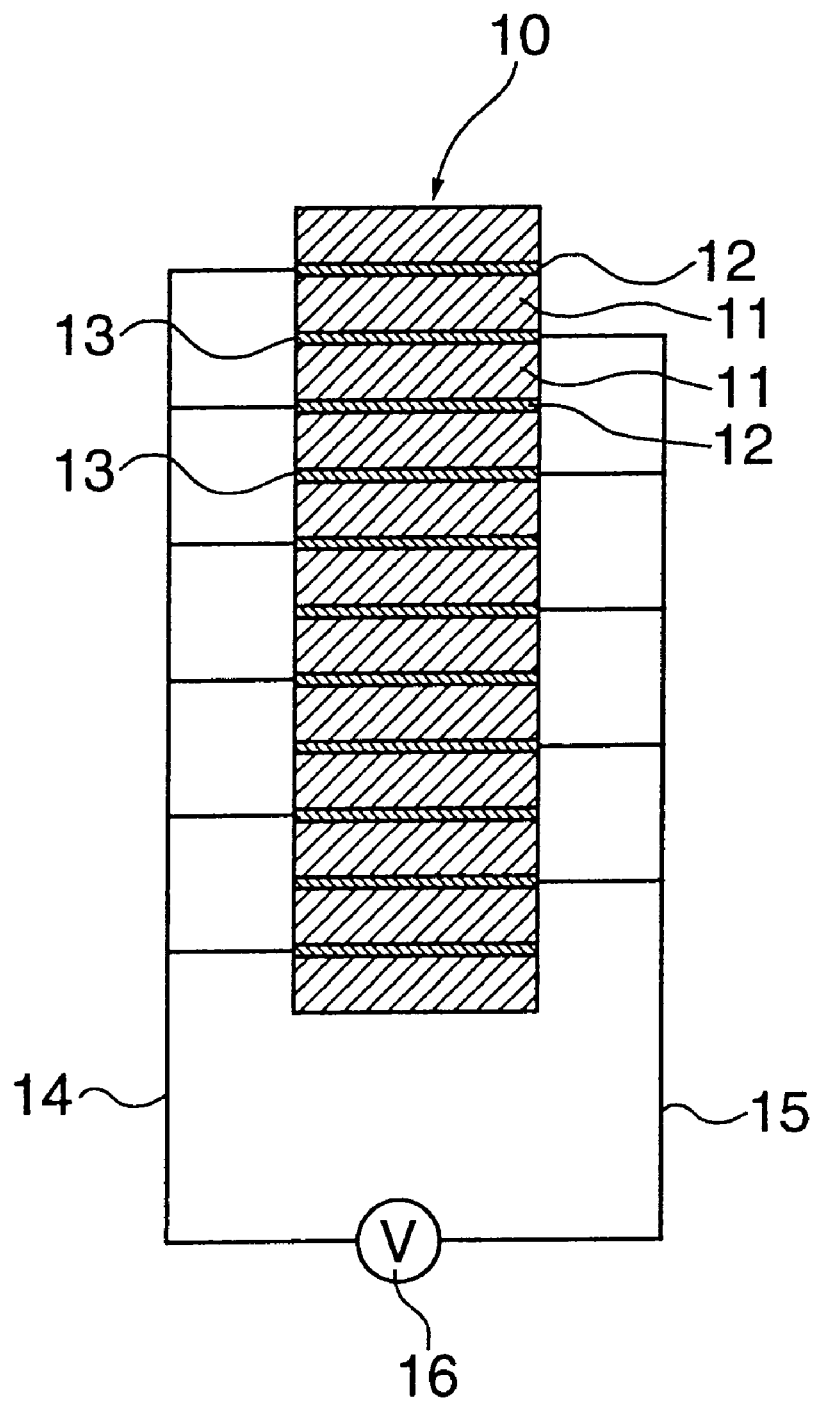
FIG. 1 is a cross-sectional view showing a configuration of a piling-up type piezoelectric device used in an embodiment of an actuator in accordance with the present invention.

A detailed configuration of a piezoelectric device used in this embodiment is shown in FIG. 1. The piezoelectric device 10 is formed by piling up of a plurality of ceramic thin plates such as PZT 11 showing piezoelectric characteristic and electrodes 12 and 13 alternately. The ceramic thin plates 11 and the electrodes 12 and 13 are fixed by adhesive. The groups of the electrodes 12 and 13 which are alternately disposed are respectively connected to a driving electric power source 16 via cables 14 and 15. When a predetermined voltage is applied between the cables 14 and the cables 15, electric fields are generated in respective ceramic thin plates 11 disposed between the electrodes 12 and 13 in a direction parallel to the piling up of the ceramic thin plates 1 and the electrodes 12 and 13. The directions of the electric fields are alternately the same direction. The ceramic thin plates 11 are piled in a manner so that the polarization of them are alternately the same direction. In other words, the directions of the polarization of the adjoining two ceramic thin plates 11 are opposite to each other.

When a DC driving voltage is applied between the electrodes 12 and 13 by the driving electric power source 16, all the ceramic thin plates 11 expand or contract in the same direction, so that the piezoelectric device 10 can expand and contract for serving as a displacing device. In a region where the electric field is small and the hysteresis of the displacement can be disregard, a relation between the displacement of the piezoelectric device 10 and the electric field generated between the electrode 12 and 13 can be regarded as linear. Subsequently, when an AC driving voltage (AC driving signals) is applied between the electrodes 12 and 13 by the driving electric power source 16, all the ceramic thin plates 11 repeats to expand and contract in the same direction corresponding to the electric fields generated between the electrodes 12 and 13. The piezoelectric device 10 has an inherent resonance frequency defined by the configuration and the electric characteristics thereof. When the frequency of the AC driving voltage coincides with the resonance frequency of the piezoelectric device 10, an impedance of the piezoelectric device 10 is sharply reduced and the displacement thereof largely increases. Since the displacement of the piezoelectric device 10 is relatively small with respect to the external sizes thereof, it is preferable to utilize the resonance phenomenon for driving the piezoelectric device 10 by the low driving voltage.

Figure 2:
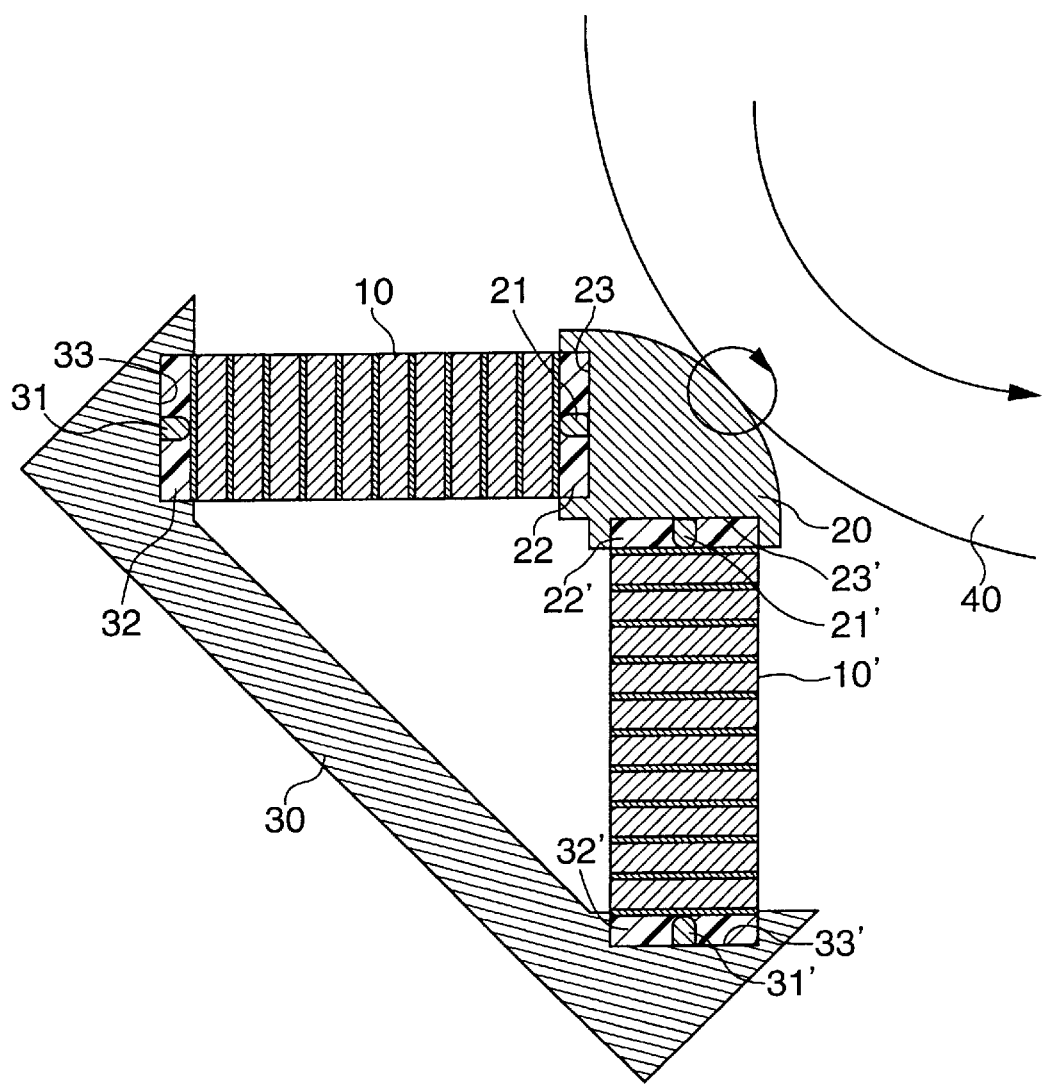
FIG. 2 is a cross-sectional view showing a configuration of the embodiment of the actuator.

A configuration of the embodiment is shown in FIG. 2. A first piezoelectric device 10 and a second piezoelectric device 10' are disposed for crossing substantially at right angle. A chip member 20 is fixed on contacting faces at top ends of the first and the second piezoelectric devices 10 and 10' positioned at crossing point thereof by an adhesive. Contacting faces at base ends of the first and the second piezoelectric devices 10 and 10' are fixed on an base member 30 by the adhesive. When the first piezoelectric device 10 and the second piezoelectric device 10' are respectively driven by the AC driving signals having the phase difference of 90 degrees, the chip member 20 can be moved for trailing an ellipse or a circle. The first piezoelectric device 10 and the second piezoelectric device 10' are substantially the same as the piezoelectric device 10 shown in FIG. 1, the elements of the second piezoelectric device 10' are distinguished from those of the first piezoelectric device 10 by adding a dash (') to the numerals.

When the chip member 20 is pushed, for example, on a cylindrical surface of a rotor 40 which can be rotated around a predetermined shaft, it is possible to convert the elliptic or the circular movement of the chip member 20 to the rotation of the rotor 40. Alternatively, when the chip member 20 is pushed, for example, on a flat face of a rod shaped member, it is possible to convert the elliptic or the circular movement of the chip member 20 to a linear movement of the rod member. Furthermore, when a plurality of the actuator is used and the displacements of them are compounded, a biaxial movement or a triaxial movement can be realized.

In this embodiment, when the first piezoelectric device 10 displaces, the second piezoelectric device 10' is configured to rotated in a direction parallel to a direction of a force received from the first piezoelectric device 10 so that the first piezoelectric device 10 hardly receives the reaction force from the second piezoelectric device 10', and vice versa. To be concretely, protrusions 21, 21', 31 and 31 are respectively formed on contacting faces of the chip member 20 and the base member 30 with the first and second piezoelectric devices 10 and 10' so as to contact the chip member 20 and the base member 30 with the first and second piezoelectric devices 10 and 10' along a line. Peripheral portions of the protrusions 21, 21', 31 and 31' and the contacting faces of the first and second piezoelectric devices 10 and 10' are fixed by adhesive layers 22, 22', 32 and 32' filled around the protrusions 21, 21', 31 and 31'.

Figure 3:
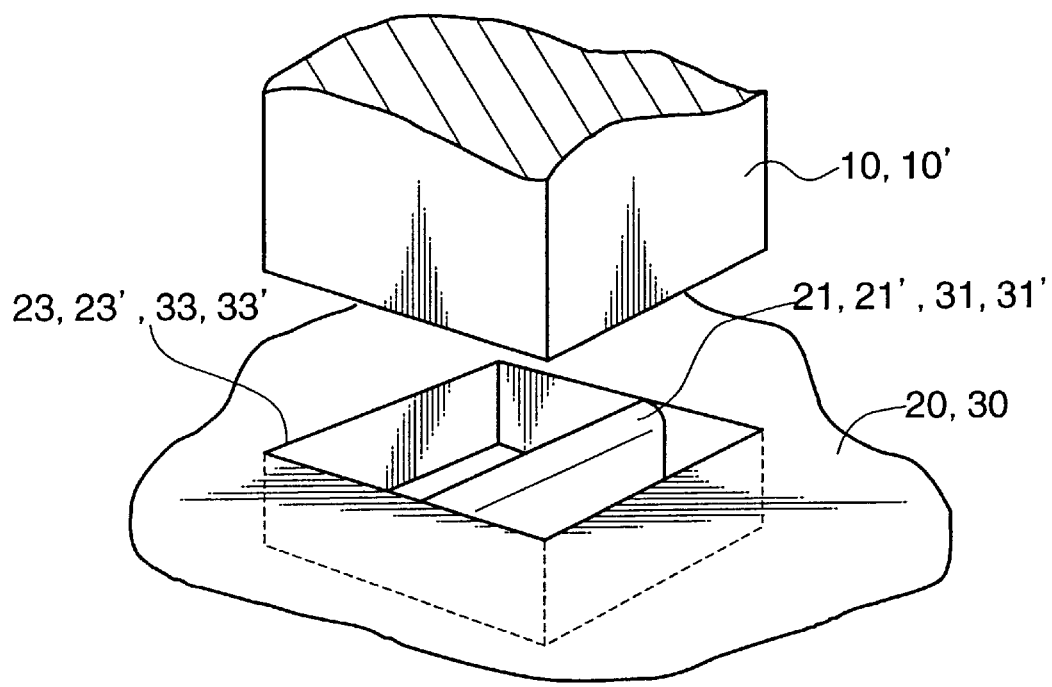
FIG. 3 is a perspective view showing a process for connecting a chip member or a base member and the piezoelectric device in the embodiment of the actuator.

A method for adhering the chip member 20 and the base member 30 to the first and second piezoelectric devices 10 and 10' is described with reference to FIG. 3. Hollows 23, 23', 33 and 33' are previously formed at positions on the contacting faces of the chip member 20 and the base member 30 to which the contacting faces of the first and second piezoelectric devices 10 and 10' are fixed. The hollows 23, 23', 33 and 33' respectively have substantially the same shape as but a little larger than a cross-section of the first and second piezoelectric devices 10 and 10' in a direction perpendicular to the displacing direction thereof. The depth of the hollows 23, 23', 33 and 33' corresponds to the thickness of the adhesive layers 22, 22', 32 and 32'. The protrusions 21, 21', 31 and 31' are formed substantially at the center of the hollows 23, 23', 33 and 33' in a direction perpendicular to a plane on which the first piezoelectric device 10 and the second piezoelectric device 10' are crosses each other. The peaks of the protrusions 21, 21', 31 and 31' are formed at the same level as the portions on the contacting faces of the chip member 20 and the base member 30 where the hollows 23, 23', 33 and 33' are not formed. After filling the adhesive into the hollows 23, 23', 33 and 33', the contacting faces of the first and the second piezoelectric devices 10 and 10' are fixed by the adhesive with contacting the protrusions 21, 21', 31 and 31'.

As a method for forming the hollows 23, 23', 33 and 33' and the protrusions 21, 21', 31 and 31', an electro-discharge machining of a metal, a precision casting such as a die cast of a metal or an injection molding of a hard resin such as FRP (Fiber Reinforced Plastic) can be used.

Figure 4A:
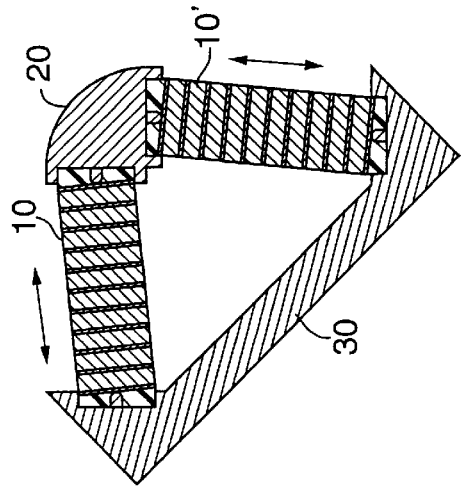
FIGS. 4A to 4D are cross-sectional views showing motion of the embodiment of the actuator.
Figure 4B:
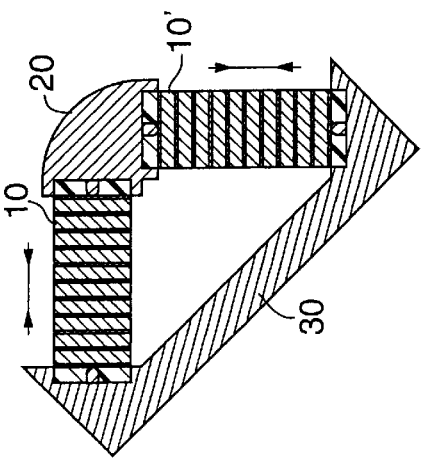
Figure 4C:
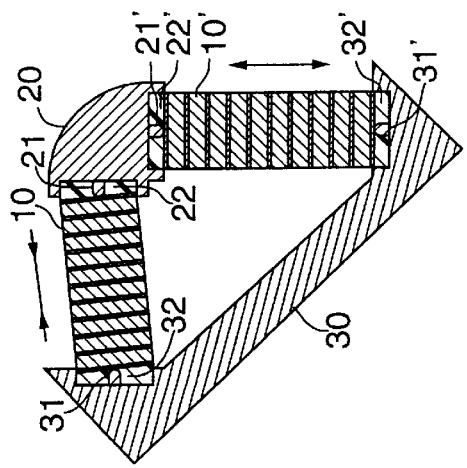
Figure 4D:
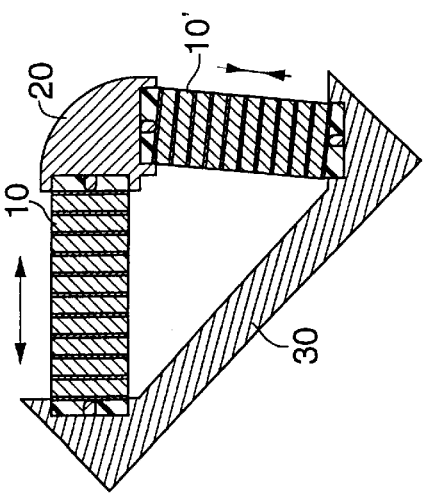

Motion of the actuator is shown in FIGS. 4A to 4D. FIG. 4A shows a condition that the first piezoelectric device 10 contracts and the second piezoelectric device 10' expands. FIG. 4B shown a condition that both of the first and second piezoelectric devices 10 and 10' expand. FIG. 4C shows a condition that the first piezoelectric device 10 expands and the second piezoelectric device 10' contracts. FIG. 4D shown a condition that both of the first and second piezoelectric devices 10 and 10' contract.

In comparison with FIG. 4A and FIG. 4D, when the second piezoelectric device 10' expands, the first piezoelectric device 10 receives a force in a direction perpendicular to the displacing direction thereof on the contacting faces of the first piezoelectric device 10 and the chip member 20, and especially at a contacting portion with the protrusion 21. On the other hand, the first piezoelectric device 10 and the chip member 20 and the base member 30 are respectively contacted by the protrusions 21 and 31 having a high rigidity along a line, and they are fixed by the adhesive layers 22 and 32 having a low rigidity. Thus, when the first piezoelectric device 10 receives the above-mentioned force, the adhesive layers 22 and 32 deforms so that the first piezoelectric device 10 rotates in the direction of the force by using the protrusion 31 as a fulcrum. Since the rigidity of the adhesive layer 22 is lower and the adhesive layer 22 can easily be deformed, most of the force from the second piezoelectric device 10' acting on the first piezoelectric device 10 is consumed for rotating the first piezoelectric device 10. Thus, the second piezoelectric device 10' hardly receives the reaction force from the first piezoelectric device 10. The same relation as the above-mentioned case is applied between FIGS. 4B and 4C.

Figure 5:
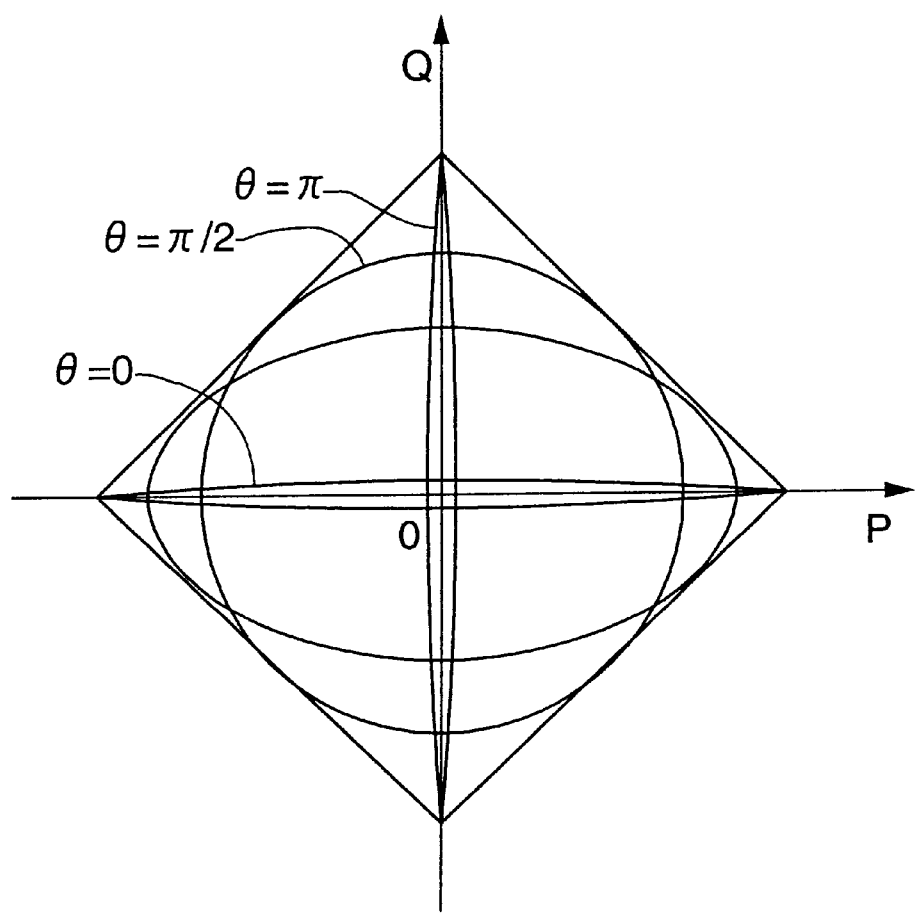
FIG. 5 is a drawing showing relations between trails of motions of the chip member and displacements of a first piezoelectric device and second piezoelectric device in the embodiment of the actuator.

Relations between the trails of the chip member 20 and the displacements of the first and second piezoelectric devices 10 and 10' are shown in FIG. 5. In the actuator, even when one of the piezoelectric device is displaced, the displaced piezoelectric device hardly receives the reaction force from the other piezoelectric device, so that it is almost the ideal condition which will be described below.

It is assumed that the first and second piezoelectric devices 10 and 10' are respectively driven by sine waves having a phase difference θ. When angular velocity is designated by "ω", time is designated by "t", and amplitude of the piezoelectric devices is assumed "1", X-Y coordinates (x, y) of the chip member 20 which is provided at Cross point of the first and second piezoelectric devices 10 and 10' are shown by the following equations (1) and (2).

$$x = \sin \omega t \quad (1)$$

$$y = \sin(\omega t + \theta) \quad (2)$$

In case of rotating the rotor 40 shown in FIG. 2, the rotation shaft of the rotor 40 (not shown in FIG. 2) exists on a bisector of an angle between the first piezoelectric device 10 and the second piezoelectric device 10'. Thus, when the bisector (a normal of the rotor 40) is regarded as an abscissa P and a line perpendicular to the bisector (a tangent of the rotor 40) is regarded as an ordinate Q, the X-Y coordinates (x, y) of the chip member 20 is converted to P-Q coordinates (p, q) by following equations (3) and (4).

$$p = (\sin(\omega t + \theta) + \sin \omega t)/\sqrt{2} \quad (3)$$

$$q = (\sin(\omega t + \theta) - \sin \omega t)/\sqrt{2} \quad (4)$$

When ωt is erased from the above equations (3) and (4), they are rewritten as the following equation (5).

$$(P^2/2) \cdot \cos^2(\theta/2) + (q^2/2) \cdot \sin^2(\theta/2) = 1 \quad (5)$$

As mentioned above, the trail of the chip member 20 becomes an ellipse in which an intercept with the abscissa P and an intercept with the ordinate Q are respectively as follows.

$$\pm\sqrt{2}\cos(\theta/2), \pm\sqrt{2}\sin(\theta/2)$$

When the phase difference θ is varied, the ellipse is changed with internally inscribing in a square as shown in FIG. 5. When the phase difference θ is 90 degrees, that is, π/2 radian, the trail of the chip member 20 becomes circle.

For reference, a relation between a trail of the chip member and two piezoelectric devices in the above-mentioned first prior art is considered.

In the first prior art, when one of the piezoelectric device displaces, the other piezoelectric device receives a force in a direction perpendicular to the displacing direction thereof. When the piezoelectric device receives a force, it generates a voltage in a direction parallel to the direction of the force by positive piezoelectric effect. Thus, the piezoelectric device becomes difficult to be deformed in the direction of the force. Furthermore, the adhesive for fixing not only the ceramic thin plates and electrodes constituting the piezoelectric devices, but also the piezoelectric devices to the chip member and the base member has elasticity, so that the adhesive restricts the deformation of the piezoelectric devices.

When the displacement of the piezoelectric device is sufficiently small with respect to the size of the piezoelectric device, it can be regarded that the resistant force for restricting the deformation of the piezoelectric device is inversely proportional to the displacement of the piezoelectric device. Since the displacement of the piezoelectric device is proportional to the driving voltage, variation of the displacement of the piezoelectric device becomes sine wave. Furthermore, the difference between the displacements of two piezoelectric devices is very small, so that the trail of the chip member becomes a circle having a radius smaller than that of the above-mentioned ideal case. When a contribution ratio of the resistant force is designated by "α", the above-mentioned equations (1) and (2) are transferred to the following equations (6) and (7).

$$x = \sin \omega t - \alpha \sin \omega t = (1-\alpha)\sin \omega t \quad (6)$$

$$y = \sin(\omega t + \theta) - \alpha \sin(\omega t + \theta) = (1-\alpha)\sin(\omega t + \theta) \quad (7)$$

On the other hand, when an electric field is applied to the piezoelectric device, not only the piezoelectric device expands and contracts in a direction parallel to the direction of the electric field, but also the piezoelectric device deformed in a direction perpendicular to the direction of the electric field. When the piezoelectric device expands, an area in a cross-section of the piezoelectric device perpendicular to the direction of the displacement decreases. Alternatively, when the piezoelectric device contracts, the area of the cross-section of the piezoelectric device increases. Furthermore, when the area of the cross-section of the piezoelectric device in the direction perpendicular to the direction of the displacement is varied, the bending rigidity of the piezoelectric device also varies. When the area of the cross-section increases, it becomes difficult to bend the piezoelectric device. Alternatively, when the area of the cross-section decreases, it becomes easy to bend the piezoelectric device. A moment of inertia of area "I" corresponding to the bending rigidity is shown by the following equation (8). The symbol "r" designates the length of each side of the cross-section of the piezoelectric device.

$$I = r^4/12 \quad (8)$$

When two piezoelectric devices are respectively driven by two alternating driving signals having a phase difference between them, degree for effecting the displacement of each piezoelectric device due to the variation of the area of the cross-section perpendicular to the direction of the displacement is different. For example, a first piezoelectric device, which is driven first, expands while the second piezoelectric device contracts. The second piezoelectric device expands while the first piezoelectric device expands. Subsequently, the first piezoelectric device contracts while the second piezoelectric device expands. The second piezoelectric device contracts while the first piezoelectric device contracts.

Since variation of the bending rigidity due to the deformation of the piezoelectric device is very small, it can be regarded as linear. The X-Y coordinates (x, y) of the chip member 20 having regard to the effect of the other piezoelectric device is shown by the following equations (9) to (12). A contribution ratio of the other piezoelectric device is designated by the symbol "β" in a region of $0 \leq \omega t < 2\pi$.

In a case of $0 \leq \omega t < \pi$;

$$x = \sin \omega t + \beta \sin(\omega t + \theta) \quad (9)$$

In a case of $\pi \leq \omega t < 2\pi$;

$$x = \sin \omega t - \beta \sin(\omega t + \theta) \quad (10)$$

In cases of $0 \leq \omega t < \pi/2$ and $3\pi/2 \leq \omega t < 2\pi$;

$$y = \sin(\omega t + \theta) + \beta \sin \omega t \quad (11)$$

In a case of $\pi/2 \leq \omega t < 3\pi/2$;

$$y = \sin(\omega t + \theta) - \beta \sin \omega t \quad (12)$$

Figure 6A:
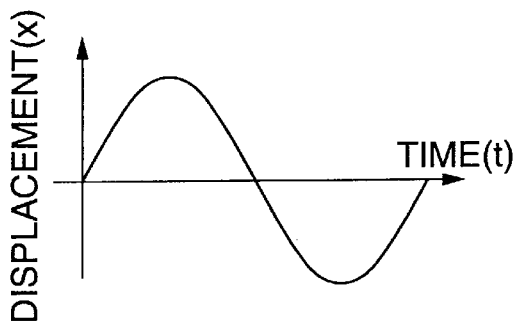
FIG. 6A is a drawing showing variation of displacement of the first piezoelectric device in the embodiment of the actuator.
Figure 6D:
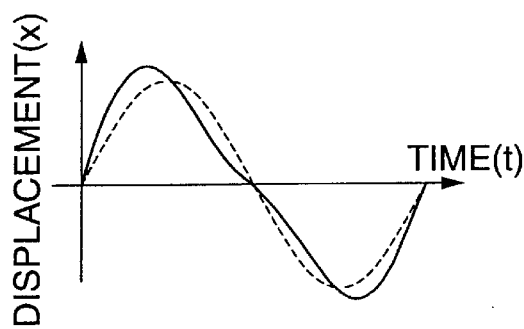
FIG. 6D is a drawing for comparing the variations of displacements of the first piezoelectric device in the embodiment of the actuator (dotted line) and in the first prior art (solid line)
Figure 6B:
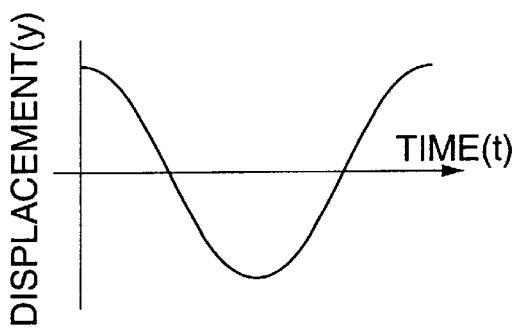
FIG. 6B is a drawing showing variation of displacement of the second piezoelectric device in the embodiment of the actuator.
Figure 6E:
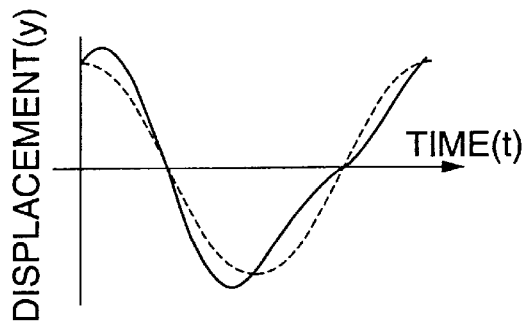
FIG. 6E is a drawing for comparing the variations of displacements of the second piezoelectric device in the embodiment of the actuator (dotted line) and in the first prior art (solid line)
Figure 6C:
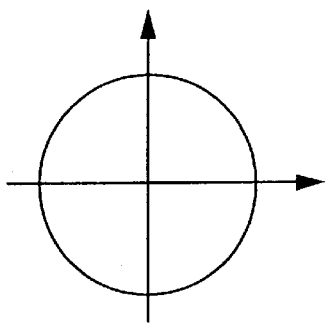
FIG. 6C is a drawing showing the trail of the motion of the chip member in the embodiment of the actuator.
Figure 6F:
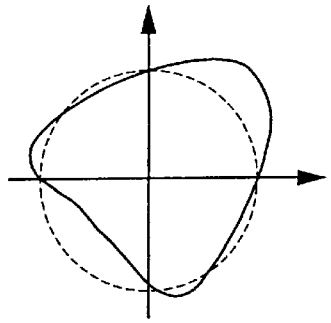
FIG. 6F is a drawing for comparing the trails of the motions of the chip members in the embodiment of the actuator (dotted line) and in the first prior art (solid line).

Subsequently, the comparison of the displacements of the first and second piezoelectric devices and the trail of the chip member in the embodiment with those in the first prior art are shown in FIGS. 6A to 6F. FIG. 6A shows the variation of the displacement "x" of the first piezoelectric device 10 in the embodiment. FIG. 6B shows the variation of the displacement "y" of the second piezoelectric device 10' in the embodiment. FIG. 6C shows the trail of the motion of the chip member 20 in the embodiment. FIG. 6D shows the variation of displacements of the first prior art illustrated by solid line. FIG. 6E shows the variation of displacements of the first prior art illustrated by solid line. FIG. 6F shows the trail of the motion of the chip member in the first prior art illustrated by solid line. In FIGS. 6D to 6F, the dotted line shows the variation of the displacement or the trail of the chip member under the ideal condition which substantially correspond to those in the embodiment.

As can be seen from FIGS. 6D and 6E, the displacement of the first piezoelectric device shown by the solid line is larger than that in the ideal condition shown by the dotted line in the regions $0 \leq \omega t < \pi/2$ and $3\pi/2 \leq \omega t < 2\pi$ where the second piezoelectric device expands. On the contrary, the displacement of the first piezoelectric device shown by the solid line is smaller than that in the ideal condition shown by the dotted line in the regions $\pi/2 \leq \omega t < 3\pi/2$ where the second piezoelectric device contracts. Similarly, the displacement of the second piezoelectric device is larger than that in the ideal condition in the regions $0 \leq \omega t < \pi$ where the first piezoelectric device expands. On the contrary, the displacement of the second piezoelectric device shown is smaller than that in the ideal condition in the regions $\pi \leq \omega t < 2\pi$ where the first piezoelectric device contracts. As a result, the trail of the motion of the chip member compound of the displacements of the first and second piezoelectric devices shows the deform shown by the solid line from the ideal circle shown by the dotted line shown in FIG. 6F.

When the trail of the movement of the chip member is deformed from the ideal circle as shown in FIG. 6F, a time period while the chip member contacts the rotor becomes shorter, so that torque of the actuator becomes insufficient. Furthermore, the trail of the motion of the chip member is longer in the normal of the rotor, so that the speed of the chip member for contacting the rotor becomes faster. It will cause the occurrence of the vibration and the noise, the wear of the material, and so on.

To the contrary, in the actuator of the embodiment, even when one of the piezoelectric devices displaces, it hardly receives the effect from the other piezoelectric device. As shown in FIGS. 6A to 6C, the displacements of the first and second piezoelectric devices 10 and 10' and the trail of the motion of the chip member 20 becomes substantially the ideal shape. Thus, the above-mentioned problems in the first prior art may not occur in the embodiment.

In the above-mentioned embodiment, the chip member 20 and the base member 30 respectively contacts with the first and second piezoelectric devices 10 and 10' along a line. However, it is possible to configure that the chip member 20 and the base member 30 respectively contacts with the first and second piezoelectric devices 10 and 10' at a point.

In the above-mentioned embodiment, the protrusions 21, 21', 31 and 31' are integrally formed on the chip member 20 and the base member 30 at the same time of forming the hollows 23, 23', 33 and 33'. However, it is possible to provide the protrusions 21, 21', 31 and 31' by independent members such as a wire. In the latter case, the size control of the protrusions 21, 21', 31 and 31' becomes easier, so that the thickness of the adhesive layer 22, 22', 32 and 32' can easily be made even. When a plurality of forces act in different directions to the same piezoelectric device, it is possible to firm the protrusions 21, 21', 31 and 31' as a sphere. In this case, for example, a bead can be used as the protrusions 21, 21', 31 and 31'.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An actuator comprising:
   a first displacing member;
   a second displacing member crossing the first displacing member at a predetermined angle;
   a driving member provided at a crossing portion of the first displacing member and the second displacing member; and
   at least one connection portion including a plurality of members respectively having different rigidities and connecting the driving member and at least one of the first displacing member and the second displacing member.

2. The actuator in accordance with claim 1, wherein said at least one of the first displacing member and the second displacing member is movable on a plane on which the displacing member expands owing to deformation of a member having a rigidity lower than that of another member included in the connection portion.

3. The actuator in accordance with claim 1, wherein the connection portion includes a protrusion made of a material having a rigidity higher than that of another member.

4. The actuator in accordance with claim 3, wherein the protrusion is formed on the driving member and contacting said one of the first displacing member and the second displacing member along a line.

5. The actuator in accordance with claim 1, wherein the connection portion includes an adhesive having a rigidity lower than that of another member.

6. The actuator in accordance with claim 1 further comprising a rotor rotated by driving force of the driving member.

7. The actuator in accordance with claim 1, wherein the first displacing member and the second displacing member are respectively driven by different driving signals having a phase difference between them.

8. An actuator comprising:

a first displacing member;

a second displacing member connected to the first displacing member with a predetermined angle;

a holder for holding at least one of the first displacing member and the second displacing member; and at least one connection portion including a plurality of members respectively having different rigidities and connecting the driving member and at least one of the first displacing member and the second displacing member.

9. The actuator in accordance with claim 8, wherein said at least one of the first displacing member and the second displacing member is movable on a plane on which the displacing member expands owing to deformation of a member having a rigidity lower than that of another member included in the connection portion.

10. The actuator in accordance with claim 8, wherein the connection portion includes a protrusion made of a material having a rigidity higher than that of another member.

11. The actuator in accordance with claim 10, wherein the protrusion is formed on the holder and contacting said one of the first displacing member and the second displacing member along a line.

12. The actuator in accordance with claim 8, wherein the connection portion includes an adhesive having a rigidity lower than that of another member.

13. The actuator in accordance with claim 8 further comprising a driving member provided at a crossing portion of the first displacing member and the second displacing member and a rotor rotated by driving force of the driving member.

14. The actuator in accordance with claim 8, wherein the first displacing member and the second displacing member are respectively driven by different driving signals having a phase difference between them.

15. An actuator comprising:

a holder;

a first displacing member, an end of which is connected to the holder, and driven by a first driving signal having a first phase;

a second displacing member, an end of which is connected to the holder, crossing the first displacing member at a predetermined angle, and driven by a second driving signal having a second phase different from the first phase; and a driving member connected to the first displacing member and the second displacing member at a crossing portion of the first displacing member and the second displacing member; and wherein connection portions between the holder and the first displacing member, the holder and the second displacing member, the driving member and the first displacing member, and the holder and the second displacing member are formed by a plurality of materials respectively having different rigidities.

16. The actuator in accordance with claim 15, wherein the first displacing member and the second displacing member are movable on planes on which the displacing members expand owing to deformation of a member having a rigidity lower than that of another member included in the connection portion.

17. The actuator in accordance with claim 15, wherein each connection portion includes a protrusion made of a material having a rigidity higher than that of another member.

18. The actuator in accordance with claim 17, wherein each protrusion is formed on the holder or the driving member and contacting one of the first displacing member and the second displacing member along a line.

19. The actuator in accordance with claim 15, wherein each connection portion includes an adhesive having a rigidity lower than that of another member.

20. The actuator in accordance with claim 15 further comprising a rotor rotated by driving force of the driving member.

* * * * *